(12) United States Patent
Miller et al.

(10) Patent No.: US 9,093,848 B2
(45) Date of Patent: Jul. 28, 2015

(54) MULTI-SOURCE POWER ADAPTER

(71) Applicants: Garold C. Miller, Glastonbury, CT (US); Nathan Daniel Weinstein, Glastonbury, CT (US)

(72) Inventors: Garold C. Miller, Glastonbury, CT (US); Nathan Daniel Weinstein, Glastonbury, CT (US)

(73) Assignee: Halo2Cloud LLC, Glastonbury, CT (US)

( * ) Notice: Subject to any disclaimer, the term of this patent is extended or adjusted under 35 U.S.C. 154(b) by 131 days.

(21) Appl. No.: 13/801,338

(22) Filed: Mar. 13, 2013

(65) Prior Publication Data

US 2014/0042969 A1 Feb. 13, 2014

Related U.S. Application Data

(63) Continuation of application No. 13/571,992, filed on Aug. 10, 2012.

(60) Provisional application No. 61/521,815, filed on Aug. 10, 2011.

(51) Int. Cl.
   *H01R 25/00* (2006.01)
   *H02J 7/00* (2006.01)

(52) U.S. Cl.
   CPC .................................. *H02J 7/0042* (2013.01)

(58) Field of Classification Search
   USPC .......... 439/638, 655, 668, 502, 131, 172, 518
   IPC .................. H01R 31/06,31/065, 23/025, 24/58, H01R 13/60
   See application file for complete search history.

(56) References Cited

U.S. PATENT DOCUMENTS

| | | |
|---|---|---|
| 5,829,993 A | 11/1998 | Wu |
| D416,233 S | 11/1999 | Tsai |
| 6,116,960 A | 9/2000 | Lloyd et al. |
| 6,358,096 B1 | 3/2002 | Beckman |
| 6,528,970 B1 * | 3/2003 | Liu et al. ........................ 320/107 |
| 6,551,142 B2 | 4/2003 | Eisenbraun |
| 6,612,875 B1 | 9/2003 | Liao |
| 6,894,457 B2 * | 5/2005 | Germagian et al. ........... 320/119 |
| 7,011,538 B2 * | 3/2006 | Chang ............................ 439/172 |

(Continued)

FOREIGN PATENT DOCUMENTS

| | | |
|---|---|---|
| JP | 2009065769 A | 3/2009 |
| JP | 2010104155 A | 5/2010 |

OTHER PUBLICATIONS

International Search Report for PCT/US2013/054498 dated Dec. 17, 2013.

*Primary Examiner* — Hien Vu
(74) *Attorney, Agent, or Firm* — McCormick, Paulding & Huber LLP

(57) ABSTRACT

A multi-source power adapter includes multiple adapter interfaces for connecting the charger unit or another electronic device to a power source, such as a standard power outlet, a car charger port, an airplane charger port, or a USB interface. In a preferred embodiment, the multi-source adapter unit provides an all-in-one charger adapter in a compact, lightweight unit. The charger adapter includes a body enclosing electrical connections; a wall plug interface operatively connected in the body and configured for insertion into a wall socket; a car charger interface formed on the body and configured for connection into a car socket; and a power output port formed in the body, and connected with the wall plug interface and with the car charger interface via the electrical connections enclosed in the body.

14 Claims, 7 Drawing Sheets

(56) References Cited

U.S. PATENT DOCUMENTS

| | | |
|---|---|---|
| 7,030,517 B2 | 4/2006 | Hansmann et al. |
| D554,585 S | 11/2007 | Nazar |
| D563,873 S | 3/2008 | Chen et al. |
| D574,833 S | 8/2008 | Hussaini et al. |
| D585,825 S * | 2/2009 | Ji .............................. D13/108 |
| D594,817 S | 6/2009 | Abdallah et al. |
| D633,436 S | 3/2011 | Griffin, Jr. |
| D636,337 S | 4/2011 | Smith et al. |
| 8,109,792 B2 * | 2/2012 | Briano et al. ............ 439/620.21 |
| D656,899 S | 4/2012 | Webb et al. |
| 8,547,056 B2 * | 10/2013 | Chang ........................ 320/107 |
| 2004/0085694 A1 | 5/2004 | Germagian et al. |
| 2012/0187902 A1 | 7/2012 | Wang |
| 2012/0238132 A1 | 9/2012 | McSweyn |
| 2014/0152257 A1 * | 6/2014 | Miller et al. ................. 320/111 |

* cited by examiner

MULTI-SOURCE POWER ADAPTER

CROSS-REFERENCE TO RELATED APPLICATION

This application claims the benefit of U.S. Provisional Application No. 61/521,815, filed Aug. 10, 2011; and of U.S. application Ser. No. 13/571,992, filed Aug. 10, 2012, both incorporated herein by reference.

FIELD OF INVENTION

The present invention generally relates to power chargers for electronic devices, and more particularly relates to a multi-source power adapter for use in charging a portable power charger and/or electronic devices from a variety of power sources.

BACKGROUND OF THE INVENTION

Present day consumers typically own several electronic devices specifically designed for portability and use on-the-go, including, for example, a mobile phone or smart phone, a portable music player like an iPod® or an MP3 player, a tablet, a portable gaming unit, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different ports and interfaces such that a single charging cable is not compatible with multiple devices. Accordingly, a tech-savvy consumer, with several electronic devices, will usually have multiple charging cables to keep track of. Even then, the consumer may not always be in a place where a power source is readily available, or even if so, may not have the appropriate cable or adapter available to use with a particular power source.

With traditional power sources, such as those noted above, it is difficult to charge multiple devices at the same time, especially where each device requires a separate charging cable. For example, a car charger port will only handle a single cable at a time. Adaptor devices are available on the market for connecting multiple devices to a power source at the same time—for example, a two-to-one or three-to-one car charger splitter. However, such adapters are often only compatible with certain interfaces. Moreover, such adapters tend to be bulky.

Multi-source adapters are also available on the market for making a charging cable compatible with multiple power sources. For example, a charging cable with a traditional plug interface for connecting the cable to a wall outlet could exchange the plug with a car charger interface, or an airplane charger interface, or a standard USB interface. However, for such adapter devices, each of the interfaces is usually a separate piece, and therefore difficult to keep track of when not in use.

Similarly, interface attachments are also available for adapting a charging cable for use with a variety of devices, each with a different interface. However, such attachments are usually separate pieces, and therefore difficult to keep track of when not in use. Further, use of such attachments does not solve the problem presented by the need to charge multiple devices at the same time, as oftentimes, only one attachment can be used with a charging cable at a time.

Existing power charger devices also usually cannot charge multiple devices at the same time. Even if multiple devices may be attached to the power charger at the same time, the charger will prioritize how the devices are recharged—i.e., it will charge one device first and then the second. However, this approach risks not having sufficient charge remaining in the charger for fully charging the second device.

Further, some portable charger devices will not permit recharging from the charger when the charger is itself being recharged or connected to a power source. Such devices require the charger unit to be disconnected from a power source before a charge will be passed on to a device connected to the charger. Also, such charger devices must be fully charged first before any device connected to the charger unit can be recharged.

In view of the foregoing, there is a need for a charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or collectively in various combinations. Additionally, there is a need for such a charger that is portable and easily used in various conditions and locations to charge one or more electronic devices simultaneously, including but not limited to in a house or office, a car or an airplane. Still further, there is a need for a charger system that is compatible with a personal computer for not only charging one or more electronic device, but also provides a conduit by which data can be exchanged between such devices and a portable computer or an external storage database. Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a portable charger is provided for charging one or more electronic devices. In general, a portable charger kit may comprise a portable charger unit combined with multiple connectors for connecting to more than one electronic device, as necessary. For example, the charger unit can include at least one power output for connection to electronic devices via connectors or charging cables, including a squid connector providing multiple connection interfaces adaptable to a variety of electronic devices. Alternatively, the charger unit can include one or more connector cables connected to the charger unit and disposed within the charger housing for connection to electronic devices. Additionally, a portable charger kit may comprise a portable charger unit combined with an adapter unit for recharging the charger unit. Additional cables can be provided in the kit, such as a USB connection cable for connecting the portable charger unit to a computer for recharging or data exchange, without departing from the principles and spirit of the present invention.

In an aspect of the present invention, a multi-source adapter unit comprises multiple adapter interfaces for connecting the charger unit or another electronic device to a power source, such as a standard power outlet, a car charger port, an airplane charger port, or a USB interface. In a preferred embodiment, the multi-source adapter unit provides an all-in-one charger adapter in a compact, lightweight unit. The charger adapter includes a body enclosing electrical connections; a wall plug interface operatively connected to the body and configured for insertion into a wall socket; a car charger interface formed on the body and configured for connection into a car socket; and a power output port formed in the body, and connected with the wall plug interface and with the car charger interface via the electrical connections enclosed in the body.

In another aspect of the present invention, the adapter unit may further include an airplane charger interface. The airplane charger interface may be disposed within the car charger interface, which is removable from the unit body to expose the airplane charger interface for use. In such an embodiment, the airplane charger may have electrical contacts which engage electrical contacts in the car charger interface to connect the car charger interface with the electrical connections enclosed in the body when the car charger interface is in place on the unit body for use, such that an electrical charge can be passed from the car charger interface to the power output port when the adapter is plugged into a car charger socket.

In another aspect of the present invention, a squid connector is provided for facilitating connection of one or more electronic devices to the portable charger unit or another power source. In a preferred embodiment, the squid connector comprises a USB connector adapted to engage a power output port of the portable charger unit or any other device with a USB port; multiple connector interfaces adaptable for various electronic devices; a retractor for extending the length of the cords of the squid connector; and a power indicator for confirming the existence of a power current being supplied through connector cables to the electronic devices to be charged.

An advantage of providing multiple connector cables—either attached to and included with the charger unit, or attachable to respective power output ports, or provided by a squid connector—is that several electronic devices can be charged at the same time. Moreover, multiple connector interfaces can be designed to attach to and accommodate various types of devices, including smart phones, mobile phones, data tablets, music players, cameras, camcorders, gaming units, e-books, Bluetooth® headsets, GPS devices, and the like.

In another aspect of the present invention, a portable charger unit for simultaneously recharging a plurality of electronic devices, each having a rechargeable internal battery, comprises a charger housing internally storing a rechargeable battery, a power input port operatively connected to the internal battery for recharging the internal battery when the charger unit is connected to an external power source, and a plurality of power output ports operatively connected to the internal battery for charging electronic devices connected to the charger unit via the output ports. The charger unit recharges two or more electronic devices simultaneously when they are all connected to the charger unit via the output ports.

In another aspect of the present invention, a portable charger kit for simultaneously recharging a plurality of electronic devices, each having a rechargeable internal battery, comprises a portable charger unit and an adapter unit. The kit may further include a squid connector or additional connector cables for connecting multiple electronic devices to the charger unit for simultaneous charging.

These and other objects, features and advantages of the present invention will become apparent in light of the detailed description of embodiments thereof, as illustrated in the accompanying drawings.

DETAILED DESCRIPTION OF THE DRAWINGS

Figure 1:
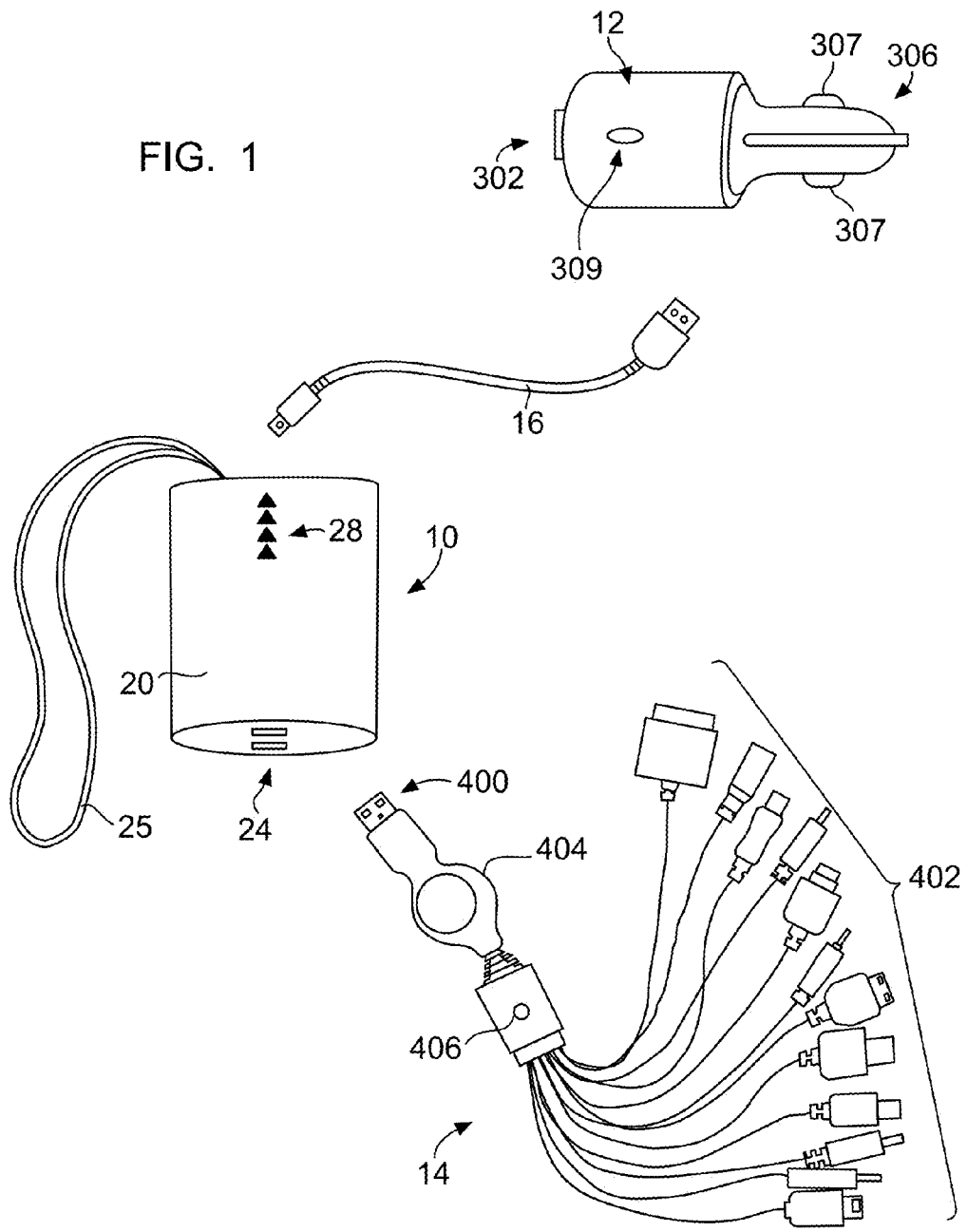
FIG. 1 shows a portable charger kit in accordance with the present invention, including a portable charger unit, an adapter unit and a squid connector.
Figure 11A:
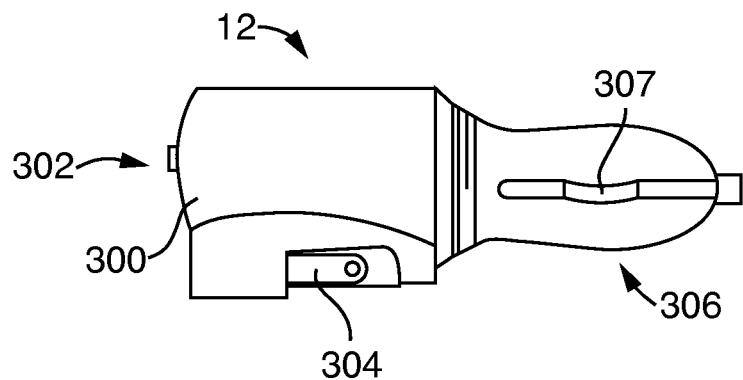
FIGS. 11A, 11B and 11C illustrate planar side views of a multi-source adapter unit comprising a part of a portable charger kit in accordance with the present invention.
Figure 11B:
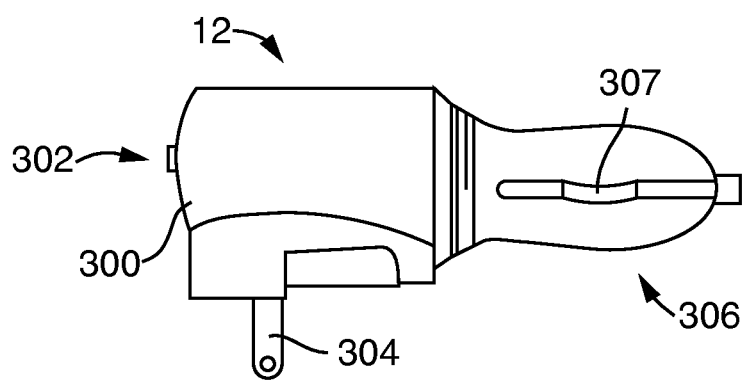
Figure 11C:
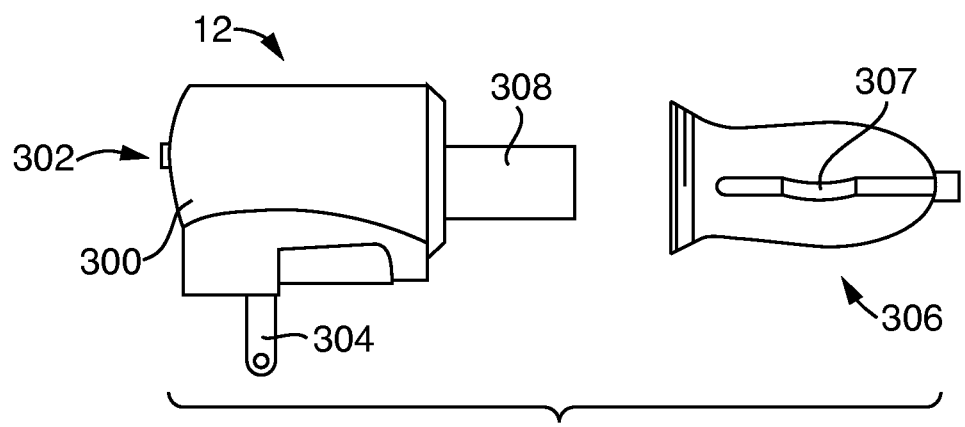

A portable charger kit in accordance with the present invention is shown in FIG. 1, and generally comprises a portable charger unit 10 having a rechargeable internal battery for recharging one or more electronic devices. The portable charger unit 10 may have a variety of designs, as discussed further below, and may be provided with connector cables and adapters suitable for recharging the internal battery of the charger unit 10 and recharging the batteries of various electronic devices connected thereto. For example, as shown in FIG. 1, the portable charger kit may be combined with at least one of a multi-source adapter unit 12, as shown in FIGS. 11A-11C, for connecting the charger unit 10 to an external power source, and a squid connector 14, for connecting one or more electronic devices to the charger unit 10. Additional connector cables can be provided with the kit, such as a USB connection cable 16, for connecting the portable charger unit 10 to the adapter unit 12 or separately to a computer for recharging or data exchange, without departing from the principles and spirit of the present invention.

In accordance with intended operation of the portable charging kit, a user can recharge one or more electronic devices using the charger unit 10, a computer, a wall socket, a car power outlet, or an airplane power outlet. For example, the kit of the present invention can be used to charge smart phones, mobile phones, data tablets, music players, cameras, camcorders, gaming units, e-books, Bluetooth® headsets and earpieces, GPS devices, and the like, either individually or collectively in various combinations. In accordance with another feature of the present invention, the portable charger kit can also be used as a conduit by which data can be exchanged between electronic devices and a portable computer or an external storage database.

Figure 2A:
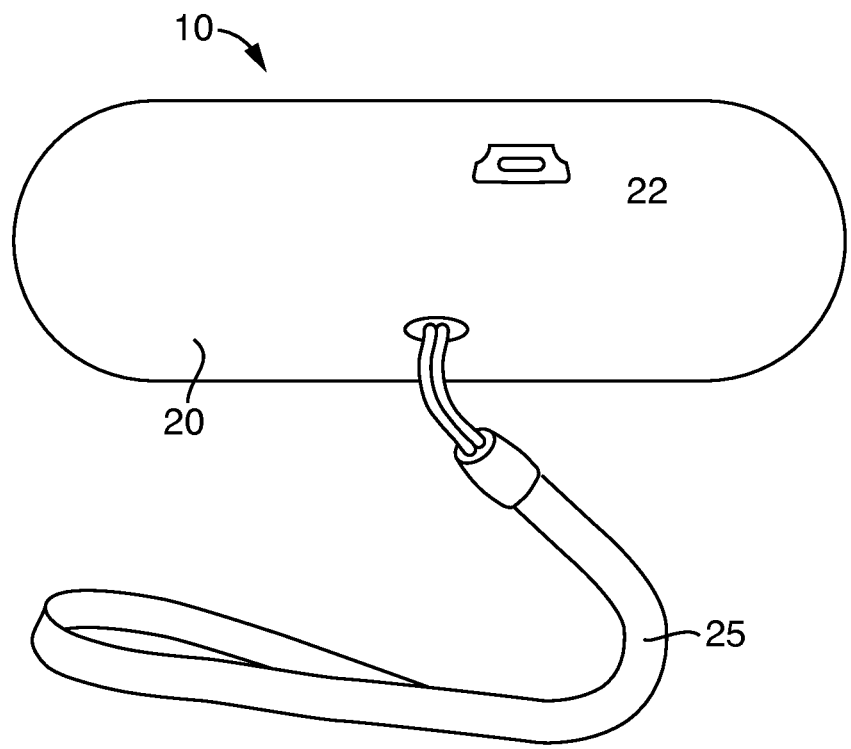
FIGS. 2A and 2B show planar end views of an embodiment of the portable charger unit of FIG. 1.
Figure 2B:
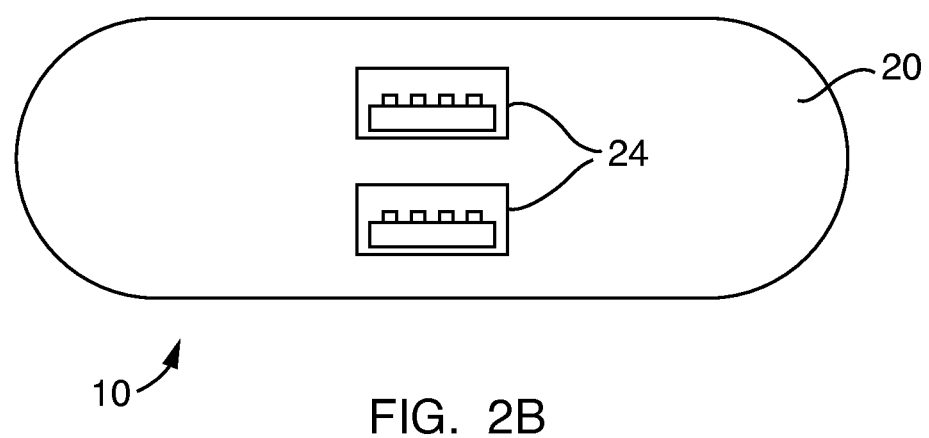

Referring to FIGS. 1, 2A and 2B, the charger unit 10 comprises a charger housing 20 with a power input 22 (FIG. 2A) and at least one power output 24 (FIG. 2B). As shown in FIG. 2A, the power input 22 generally takes the form of a mini-USB port, but can take the form of any known interface for connecting a device with a power source, including but not limited to a USB interface, a micro-USB interface, or an AC-to-DC connector interface. As shown in FIG. 2B, two USB ports are provided as power outputs 24. As a result, the charger unit 10 can be connected to two connector cords and/or devices via the USB ports at the same time. Again, the power output ports 24 can take the form of any known interface for connecting devices, including but not limited to a mini-USB interface, a micro-USB interface, or the like, and indeed, the two output ports 24 need not be the same type of interface. Additionally, the charger unit 10 can be connected to more than two devices at the same time using the squid connector 14 included in the portable charger kit of the present invention, as described in further detail below.

In accordance with the present invention, the charger unit 10 is readily portable as a result of the small size of the housing 20. A lanyard 25 can be provided for carrying the charger unit 10. Despite the small size of the unit, the power capacity is very high so that the charger 10 can accommodate multiple electronic devices at the same time.

Figure 3:
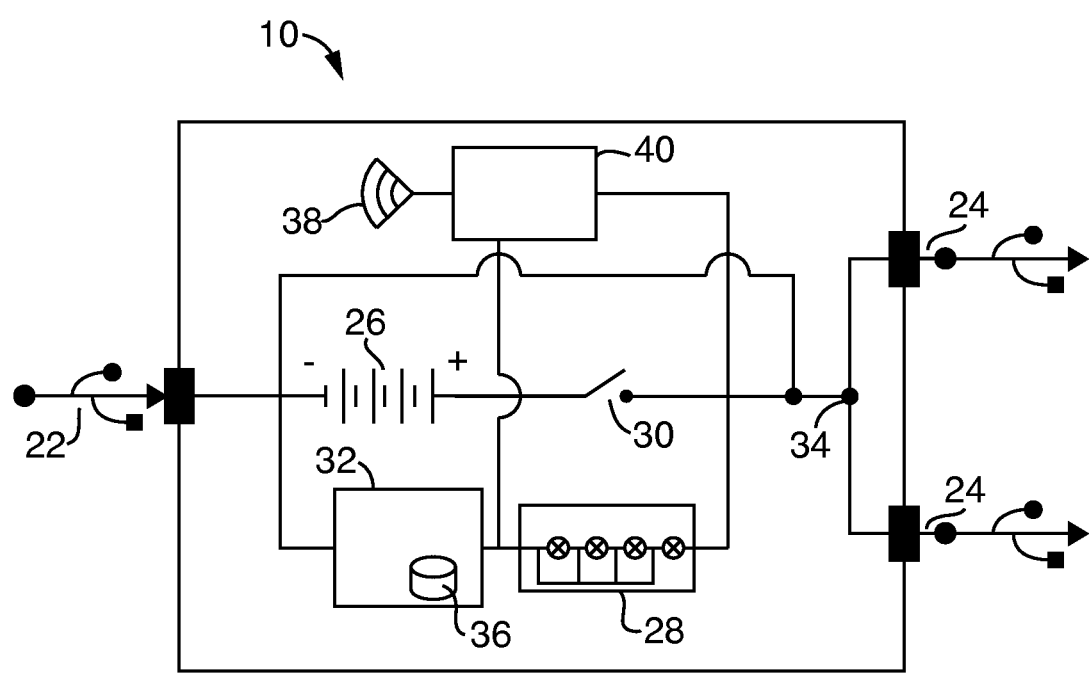
FIG. 3 illustrates a schematic view of the internal components of the charger unit of FIG. 1.

Referring to FIG. 3, the charger unit 10 comprises a rechargeable battery unit 26 disposed within the charger housing 20 that can be recharged by connecting the charger unit 10 to an external power source, such as a computer, a wall socket, a car or an airplane, using a power connector attached to the power input 22 of the charger unit 10. For example, the power connector can be a cable, such as the connection cable 16 having a mini-USB interface on one end for insertion into the input port 22 of the charger unit 10 and a standard USB interface on the other end for insertion into a USB port of a computer. Alternatively, the USB interface of the cable 16 can be inserted into the adapter unit 12 included in the portable charger kit of the present invention, as discussed in further detail below, for connection to a standard power source, such as a wall-socket via a standard U.S. plug or a variety of foreign plug styles, a car charger socket—e.g., a cigarette lighter socket—via a car charger interface, or an airplane charger socket via an airplane charger interface. In preferred embodiments, the rechargeable battery unit 26 is preferably a Lithium-Ion battery.

The rechargeable battery unit 26 is disposed within the charger housing 20 and is operatively connected with the power input port 22 for recharging the battery 26 when the charger unit 10 is connected to an external power source via the power input 22. The rechargeable battery 26 is also operatively connected with each of the power output ports 24 for recharging electronic devices connected to the charger unit 10 via the power output ports 24 from the rechargeable battery unit 26.

The charger housing 20 also includes a power indicator means 28 that will indicate not only that an electrical current is being supplied to one or more electronic devices connected to the charger unit, but also what the remaining capacity of the internal battery 26 in the charger unit 10 is. For example, in an embodiment of the present invention illustrated in FIG. 1, the power indicator means 28 comprises a series of four lights, but can include more or fewer lights without departing from the principles and spirit of the present invention. When the battery 26 is at full capacity, all the lights will be lit up. As the battery power decreases, the lights will correspondingly decrease by one as the power is used—e.g., from four to three to two to one to none. Thus, when the battery 26 is at half capacity, only two lights will be lit up. If there is no capacity left in the internal battery 26, none of the lights will be lit up. Alternatively, the power indicator means 28 can comprise a digital interface that provides a battery capacity level for the internal rechargeable battery unit 26, or another known means of providing battery level information.

The charger housing 20 may include additional indicator means providing separate information for separate functions of the charger unit. For example, separate indicator means can be provided for the power level of the internal rechargeable battery unit 26 in the charger unit 10 and for the electronic devices attached to the charger unit 10 via each power output port 24. Similarly, the device may use a digital output that provides data regarding the power level of the internal rechargeable battery unit 26 separate from data regarding any electronic device attached to the charger unit 10 via each of the output ports 24.

In a preferred embodiment of the present invention, the charger unit 10 turns on when an electronic device needing charging is plugged into the charger unit 10. In alternate embodiments of the present invention, the charger unit 10 may include "shake-to-activate" technology, whereby the unit 10 is turned on by shaking the charger housing 20. In further alternate embodiments, the charger unit 10 can include an on/off button or switch for activating and deactivating the unit 10, such as the on/off button 129 shown in FIG. 4 and on/off button 229 shown in FIG. 8.

As illustrated in FIG. 3, the charger unit 10 includes an internal switch 30 disposed within the charger housing 20. In a preferred embodiment, the switch 30 actuates to an "on" position when a device is connected to the charger unit 10 via an output port 24. In an alternate embodiment, the switch 30 actuates to an "on" position by a quick force—such as the force created by a shake of the charger 10.

The power indicator means 28 can confirm that the switch has been turned "on" by lighting up. The switch 30 is operatively connected to the rechargeable battery unit 26. The charger housing 20 encloses various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and/or various input/output (I/O) support circuitry. The electrical components may also include components for sending and receiving data and media (e.g., antenna, receiver, transmitter, transceiver, etc.).

As illustrated in FIG. 3, the charger unit 10 comprises a controller, including a processing unit 32, configured to execute instructions and to carry out operations associated with the charger unit 10. For example, the processing unit 32 can keep track of the capacity level of the battery unit 26, store data or provide a conduit means by which data can be exchanged between electronic devices, such as between a smart phone and a computer. The processing unit 32 communicates with the battery unit 26 to determine how much capacity is remaining in the battery 26. Upon determining the capacity level, the processing unit 32 communicates with the power indicator means 28 to provide the user with the appropriate signal for showing how much capacity is remaining in the internal rechargeable battery unit 26—e.g., two out of four lights indicates a half-full battery. In an alternate embodiment of the present invention, the power indicator means 28 can activate to show the power level in the internal battery 26 using the "shake-to-activate" technology—i.e., information regarding the power level remaining in the battery unit 26 may be provided by shaking the charger unit 10. In still further embodiments, indicator means can be provided to show the battery capacity level of one or more electronic devices connected to the charger unit 10.

The processing unit 32 also includes a smart interface to determine the total current required for the specific devices connected to the charger unit 10. For example, if two devices are connected to the charger unit 10 via each of the output ports 24, the processing unit 32 will assess how much power is needed to fully charge each of the devices and efficiently allocate an appropriate current to each of the devices at a node 34 so that each device can be charged in the shortest amount of time without interfering with the charging operation of the other device or without overloading the capacity of the charger unit 10. Similarly, if four devices are connected to the charger unit 10 via a squid connector 14, the processing unit 32 will likewise assess how much power is needed to fully and efficiently charge each of the devices. In this regard, the processing unit 32 operates in connection with the input/output (I/O) support circuitry to control interactions with devices connected to the charger unit 10. The I/O support circuitry may be integrated with the processing unit 32 or may be a separate component. Generally, the I/O support circuitry operates by exchanging power (and possibly data) between the charger unit 10 and electronic devices connected thereto via the output ports 24.

The processing unit 32 also preferably includes a timer for automatically turning the charger unit 10 off if there is no device attached to the unit 10 for a predetermined period of time. In this regard, the capacity of the battery 26 can be preserved. Upon shut down of the charger unit 10, the power indicator means 28 will indicate that the charger 10 is being turned off—for example, the lights will provide a sequential blinking signal.

The processing unit 32 further includes a storage unit 36 that provides a place to hold data or instructions for operation of the charger unit 10 and rechargeable battery unit 26, or data exchanged between the charger unit 10, a computer, and electronic devices connected to the charger unit 10, or memory needed for further operations of the charger unit 10.

Referring again to FIG. 3, the charger unit 10 can include communications components for sending and receiving data and media. For example, an antenna 38 is provided in connection with a transceiver 40, or a receiver and transmitter (not shown), for communication over a wireless communication link. Components of transceivers, receivers, and transmitters are generally well known in the technical field, and thus are not further discussed herein.

The charger unit 10 of the present invention is adaptable to recharge an electronic device connected to the charger unit 10 directly from the internal rechargeable battery unit 26 or alternately from a power source to which the charger unit 10 is connected. Thus, the charger unit 10 can be a conduit through which a charge is provided from a standard power source, such as a wall socket, a car charger socket, an airplane charger socket, or even a computer. In this situation, the power charge bypasses the internal battery unit 26. Indeed, in a preferred embodiment of the present invention, a charge provided from a standard power source can recharge the internal battery unit 26 simultaneously with one or more electronic devices connected to the charger unit 10. Additionally, the portable charger unit 10 can be disconnected from a standard power source, even when electronic devices are connected to the charger unit 10, and continue to recharge the electronic device from the internal battery unit 26 without interfering with the recharging process. For example, the charge switches from the external power source to the internal battery unit 26 as necessary.

An alternate embodiment of the charger unit is illustrated in FIGS. 4-7. As shown, the charger unit 110 comprises a charger housing 120 having two connector cables 125a and 125b attached to the output ports of the charger unit 110 to connect respective electronic devices to the charger unit 110 to be recharged from an internal rechargeable battery unit 26. As shown, the charger unit 110 further includes a power indicator means 128 (comprising three lights) and an on-off button 129, each operatively connected to the internal functional components and electrical circuitry for operating the charger unit 110. The internal functional components and electrical circuitry, including the internal rechargeable battery unit and a processing unit, operate similarly to the charger unit 10 shown in FIGS. 1-3 and discussed above.

Preferably, the connector cables 125a and 125b are permanently connected to the charger housing 120 and the output ports, although alternate embodiments may include connector cables that are removable and replaceable so as to permit different connection interfaces to be used with the charger unit 110. Storage cavities 150a and 150b are formed into the charger housing 120 for receiving the connector cables 125a and 125b when not in use. For example, FIGS. 4, 6A-6B and 7B illustrate the connector cables 125a and 125b disposed within the exterior volume and footprint of the charger housing 120 in a non-use condition. By comparison, FIG. 5 shows the connector cables 125a and 125b removed from the storage cavities 150a and 150b to make the connection interfaces thereon exposed for connection to electronic devices.

Referring again to FIG. 5, the connector cables 125a and 125b each include a distal end 156 having a connection interface 158. For example, one cable 125a comprises a USB connection interface 158a, while the other cable 125b comprises a micro-USB connection interface 158b. The cables 125a and 125b may utilize any known interface without departing from the spirit and principles of the present invention. Additionally, as noted above, the cables 125a and 125b can be removable and replaceable so as to permit a user to easily change the connection interface for use with varying electronic devices. In this regard, the proximal ends 160 of the connector cables 125a and 125b include an interface that complements a respective output port provided in the charger housing 120 for attaching the connector cables 125a and 125b to the charger housing 120.

The connector cables 125a and 125b are preferably flexible so they can be bent away from the charger housing 120 to connect to an electronic device during use of the charger unit 110. The storage cavities 150a and 150b include channels 152 to receive a cord portion 162 of each of the cables 125a and 125b within the footprint of the charger housing 120.

The distal ends 156 of the connector cables 125a and 125b, having the connection interfaces 158, each includes a head 164 at the end of the respective cord portion 162 that is received within a respective storage cavity 150a and 150b on the charger housing 120. Preferably, the shape of the head 164 complements the storage cavity to provide a sleek look to the charger housing 120 when the connector cables 125a and 125b are stored. Additionally, the head 164 and cord portion 162 of each cable 125a and 125b is preferably snap-fitted into the storage cavity 150a or 150b when stored so that the connector cables 125a and 125b do not accidentally disengage or otherwise come loose from the storage cavities 150a and 150b.

Figure 7A:
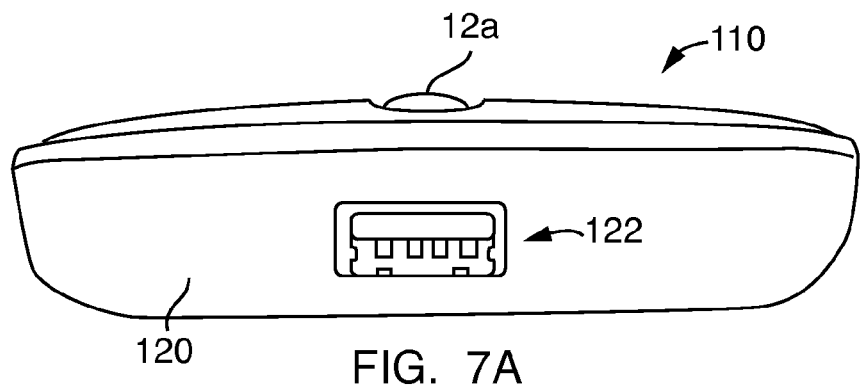
FIGS. 7A and 7B show planar end views of the charger unit of FIG. 4.
Figure 7B:
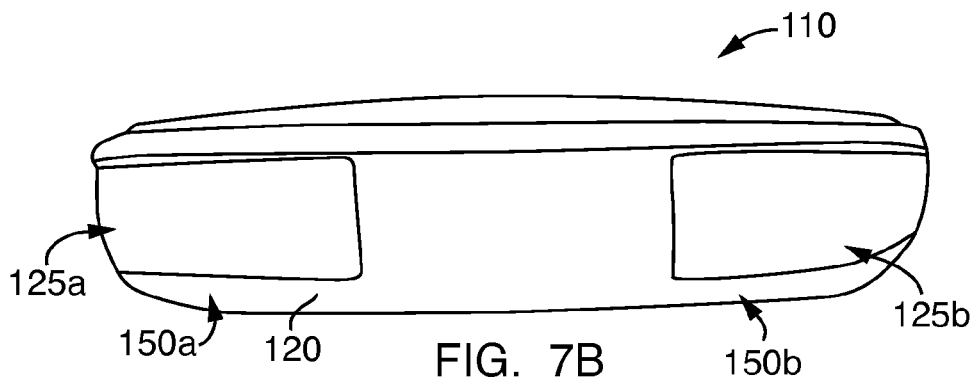

Referring to FIG. 7A, the charger housing 120 further includes a power input port 122 for connecting the charger unit 110 to an external power source to recharge the internal rechargeable battery unit. As shown, the power input port 122 comprises a USB port, but can take the form of any known interface for connecting a device with a power source, including but not limited to a mini-USB interface, a micro-USB interface, or an AC-to-DC connector interface.

In an alternate embodiment of the charger unit 110, the charger housing 120 can include one or more additional output ports comprising, for example, a USB port for receiving a separate connector cable (e.g., cable 16) to attach additional devices to the charger unit 110. Indeed, a squid connector 14 can be used to connect multiple devices to the charger unit 110 even when both of the connector cables 125a and 125b are already connected to respective devices. Still further, one of the attached connector cables 125a or 125b may be designated as a power input connection for recharging the internal rechargeable battery, and the other connector cable 125a or 125b and an output port (e.g., port 122 shown in FIG. 7A) provided on the charger housing 110 can be used to charge multiple electronic devices simultaneously. In such a situation, the output port requires a separate cable to be connected between the charger unit 110 (via the output port) and the device(s) to be recharged.

Figure 8:
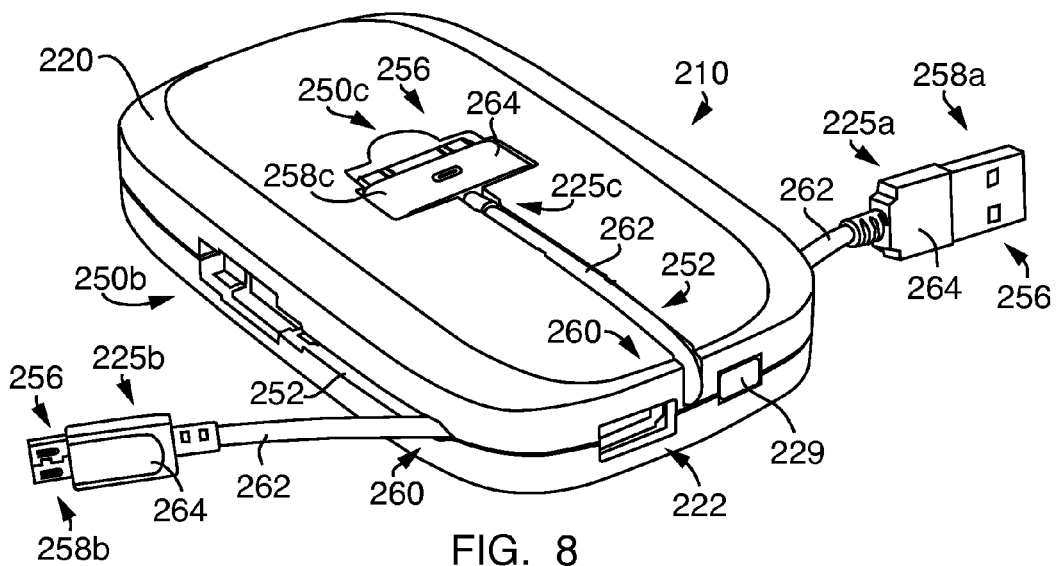
FIG. 8 shows a perspective view of another alternate embodiment of a portable charger unit in accordance with the present invention.
Figure 9A:
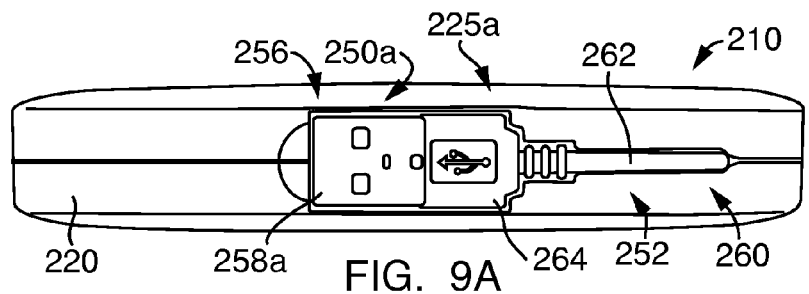
FIGS. 9A and 9B show planar side views of the charger unit of FIG. 8.
Figure 9B:
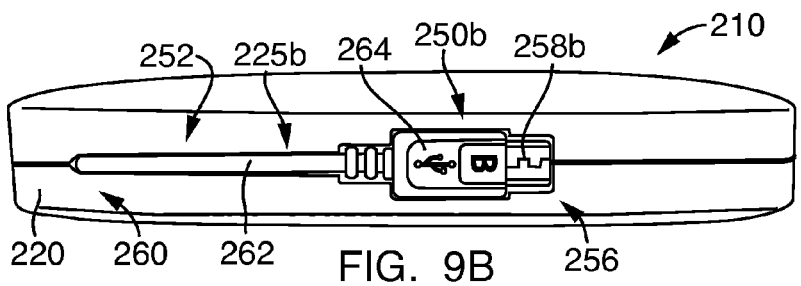
Figure 10:
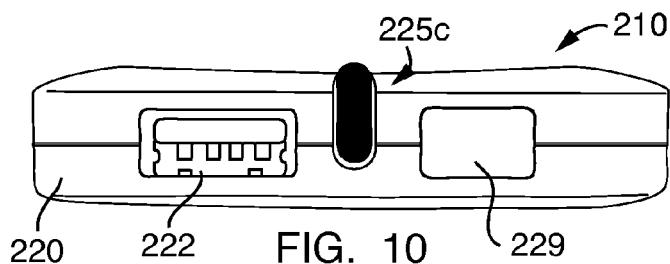
FIG. 10 shows a planar end view of the charger unit of FIG. 8.

Another alternate embodiment of the charger unit, generally designated by reference numeral 210, is illustrated in FIGS. 8-10. As shown, the charger unit 210 comprises a charger housing 220 having three connector cables 225a, 225b and 225c attached to output ports of the charger unit 210 to connect respective electronic devices to the charger unit 210 to be recharged from an internal rechargeable battery unit 26. As shown, the charger unit 210 further includes an on-off button 229 on the end that is operatively connected to the internal functional components and electrical circuitry for operating the charger unit 210. The internal functional components and electrical circuitry, including the internal rechargeable battery unit and a processing unit, operate similarly to the charger unit 10 shown in FIGS. 1-3 and discussed above.

Storage cavities 250a, 250b and 250c are formed into the charger housing 220 for receiving the connector cables 225a, 225b and 225c when not in use. For example, as shown in FIGS. 9A and 9B, two cavities 250a and 250b are formed on each side of the charger housing 220 for receiving a respective connector cable 225a and 225b. As shown in FIG. 8, a third storage cavity 250c is formed on the top of the charger housing 220 for receiving its own connector cable 225c. FIGS. 9A and 9B illustrate connector cables 225a and 225b disposed within the volume of the charger housing 220 in a non-use condition. By comparison, FIG. 8 shows one connector cable 225c disposed in a non-use condition, with the other two connector cables 225a and 225b are removed from their storage cavities 250a and 250b to make the connection interfaces 258 thereon exposed for connection to electronic devices.

Figure 4:
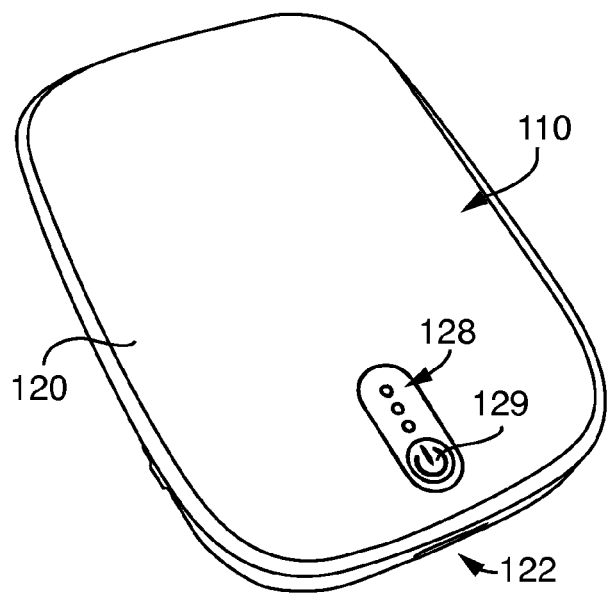
FIG. 4 shows a perspective view of an alternate embodiment of a portable charger unit in accordance with the present invention.
Figure 5:
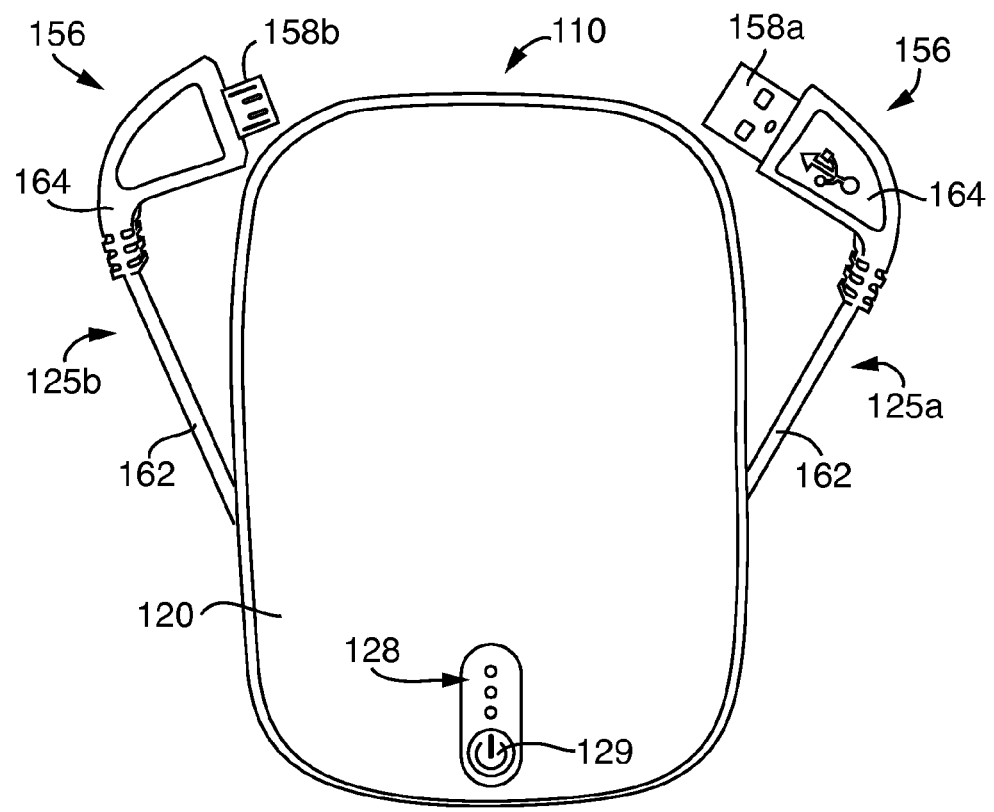
FIG. 5 shows a planar top view of the charger unit of FIG. 4.
Figure 6A:
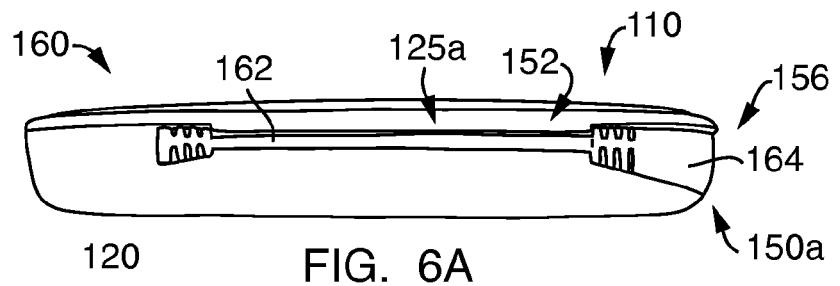
FIGS. 6A and 6B show planar side views of the charger unit of FIG. 4.
Figure 6B:
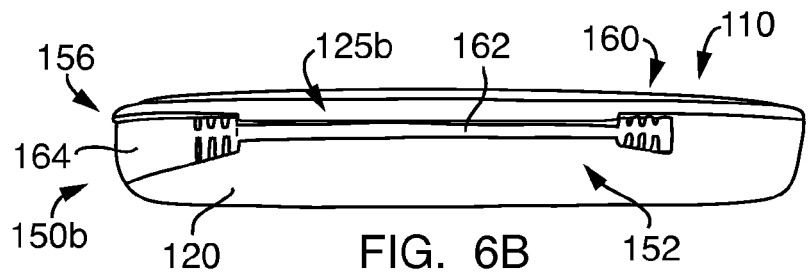

As with the embodiment shown in FIG. 4 and discussed above, preferably, the connector cables 225a, 225b and 225c are permanently connected to the charger housing 220 and their respective output ports, although alternate embodiments may include connector cables that are removable and replaceable so as to permit different connection interfaces to be used with the charger unit 210.

Referring again to FIG. 8, the connector cables 225a, 225b and 225c each include a distal end 256 having a connection interface 258. For example, one cable 225a comprises a USB connection interface 258a, while another cable 225c comprises a micro-USB connection interface 258b, and a third cable 225c comprises an Apple® connection interface 258c. The cables 225a, 225b and 225c may utilize any known interface without departing from the spirit and principles of the present invention. Additionally, as noted above, the cables 225a, 225b and 225c can be removable and replaceable so as to permit a user to easily change the connection interface for use with varying electronic devices. In this regard, the proximal ends 260 of the connector cables 225a, 225b and 225c include an interface that complements a respective output port provided in the charger housing 220 for attaching the connector cables 225a, 225b and 225c to the charger housing 220.

The connector cables 225a, 225b and 225c are preferably flexible so that they can be bent away from the charger housing 220 to connect to an electronic device during use of the charger unit 210. Each of the storage cavities 250a, 250b and 250c includes a channel 252 to receive a cord portion 262 of the cables 225a, 225b and 225c within the footprint of the charger housing 220.

The distal end 256 of each connector cable 225a, 225b and 225c, having the connection interface 258a, 258b or 258c, includes a head 264 at the end of the cord portion 262 that is received within a respective storage cavity 250a, 250b or 250c in the charger housing 220. Preferably, the shape of the head 264 complements the storage cavity so that the cable and interface can be stored within the footprint and exterior volume of the charger housing 220 with no parts sticking out. Additionally, the head 264 and cord portion 262 of each cable 225a, 225b and 225c is preferably snap-fitted into a respective storage cavity 250a, 250b and 250c when stored so that the connector cables 225a, 225b and 225c do not accidentally disengage or otherwise come loose from the storage cavities 250a, 250b and 250c.

Referring to FIG. 10, the charger housing 220 further includes a power input port 222 for connecting the charger unit 210 to an external power source to recharge the internal rechargeable battery unit. As shown, the power input port 222 comprises a USB port, but can take the form of any known interface for connecting a device with a power source, including but not limited to a mini-USB interface, a micro-USB interface, or an AC-to-DC connector interface.

In an alternate embodiment of the charger unit 210, the charger housing 220 can include one or more additional output ports comprising, for example, a USB port for receiving a separate connector cable to attach additional devices to the charger unit 210. Indeed, the squid connector 14 can be used to connect multiple devices to the charger unit 210 even when all of the connector cables 225a, 225b and 225c are already connected to respective devices. Still further, one of the attached connector cables 225a, 225b or 225c may be designated as a power input connection for recharging the internal rechargeable battery of the charger unit 210, and the other connector cables and at least one output port (e.g., port 222) provided on the charger housing 220 can be used to charge multiple electronic devices simultaneously. In such a situation, the output port requires a separate cable (e.g., cable 16) to be connected between the charger unit 210 (via the output port 222) and the device(s) to be recharged.

As shown in FIGS. 11A-11C, the adapter unit 12 comprises a multi-functional power supply adapter for providing power to a charger unit or a portable electronic device from multiple power sources, as needed. As shown, the adapter unit 12 comprises a main body 300 having at least one interface for connecting a portable charger device (e.g., any one or more of the charger units 10, 110 or 210) or another electronic device to a power source, such as a standard power outlet, a car charger port, an airplane charger port, or a computer, via the adapter unit 12. In a preferred embodiment, the adapter unit 12 provides an all-in-one charger adapter in a compact, lightweight unit.

As shown, the adapter unit 12 includes at least one output port 302—e.g., a USB output port—whereby the adapter unit 12 can be connected to a charger unit or another electronic device via a separate cable (e.g., cable 16) to recharge the internal battery of the charger unit or other device. Thus, the output port 302 permits the adapter unit 12 to be used to directly charge a computer or any other electronic device, for example, if the charger unit is not available or out of power. The adapter unit 12 further includes a plug 304 for a standard wall socket, and at least one of a car charger interface 306 and an airplane charger interface 308. The output port 302 is electrically connected with each of the input interfaces 304, 306 and 308 via conventional power conversion circuitry (not shown) for providing electrical power to a device connected to the output port 302. In other words, the output port 302 is electrically connected with the AC wall plug 304 via AC-DC power conversion circuitry, and with each of the DC charger interfaces 306, 308 via DC-DC power conversion circuitry. For example, the AC-DC power conversion circuitry may be rated at 110-240V input, 5V/1 A output; the DC-DC power conversion circuitry may be rated at 12-24V input, 5V/1A output.

The adapter unit 12 also includes a power indicator 309 for confirming the existence of a power current moving between at least one of the input interfaces 304, 306 or 308 and the output port 302. As shown in FIG. 1, the power indicator 309 is a light that can indicate when a current is moving through the adapter unit 12—i.e., the unit 12 is connected to an external power source via one of the input interfaces 304, 306 and 308 and said power current can be supplied to a power charger or an electronic device when connected to the output port 302 of the adapter unit 12. In this regard, the power indicator 309 is operatively connected with each of the input interfaces 304, 306 and 308, as well as the output port 302, typically via the same circuitry interconnecting these elements for intended operation of the adapter unit 12 as described herein.

The adapter unit 12 may further include an internal rechargeable battery associated with the internal circuitry and electrical connections of the adapter unit 12 for supplying electrical current to the power output port 302 and for receiving electrical current from the input interfaces 304, 306 and 308. Indeed, such a battery unit is operatively connected with such inputs and outputs much in the same manner as for the portable charger devices described herein (e.g., any one or more of the charger units 10, 110 or 210) and as illustrated in FIG. 3. Additionally, the battery unit may be associated with an internal switch for controlling supply of an electrical current from the battery unit to the power output port 302 in response to an actuating motion of the adapter unit body—e.g., a shaking motion of the adapter unit 12.

In a preferred embodiment, as illustrated in FIG. 11C, the airplane charger interface 308 is disposed within a removable car charger interface 306, whereby the latter interface 306 can be removed to expose the former interface 308 for use. Additionally, the plug interface 304 is designed to fold within the footprint of the main body 300 for storage when not in use or needed, such as shown in FIG. 11A. In these regards, the adapter unit 12 can be designed with a compact, all-in-one design, which is advantageous for storage and travel.

In the embodiment shown in FIG. 11C, the car charger interface 306 includes contacts 307 in accordance with standard car charger designs for providing a current from the power source through the adapter unit 14. The car charger contacts 307 are internally operatively connected with contacts on the airplane charger interface 308 so that the current is provided through the adapter unit 12 uninterrupted. When the car charger interface 306 is removed, the airplane contacts are exposed for connection to an airplane power socket.

The adapter unit 12 can be modified to use additional input connectors, such as foreign plug designs.

As shown in FIG. 1, the squid connector 14 provides a user with the ability to connect multiple electronic devices to a power source for recharging. In a preferred embodiment, the squid connector 14 comprises a USB interface on a first end 400 that is adapted to engage a complementary port on a power source, such as the power output ports of the portable charger units discussed above, the power output port on the adapter unit discussed above, or any other device with a USB port. The other end of the squid connector 14 comprises multiple connector interfaces 402 adaptable for various electronic devices. As shown, the squid connector 14 provides connection capability of twelve different devices, but can be used with more or fewer connector interfaces 402 without departing from the principles and spirit of the present invention. The connector interfaces 402 can be designed to attach to and accommodate various types of devices, including smart phones, mobile phones, data tablets, music players, cameras, camcorders, gaming units, e-books, Bluetooth® headsets and earpieces, GPS devices, and the like, from a variety of manufacturers and brands. In use, several electronic devices can be charged at the same time.

As shown in FIG. 1, the squid connector 14 further includes a retractor 404 for extending the length of the cords of the squid connector 14, and a power indicator 406 for confirming the existence of a power current being supplied to the electronic devices to be charged. As shown, the power connector 406 is a light indicating that the charger or an external power source is supplying a power current to the devices through the squid connector 14.

Though provided as a portable charger kit, each of the components shown in FIG. 1—i.e., the charger unit 10, 110 or 210, the adapter unit 12, and the squid connector 14—can be used individually, or in various combinations, as needed. For example, a charger unit can be directly connected with an electronic device via one of its USB output ports. Similarly, the charger unit alone can be used to charge two electronic devices because it has two such output ports. Alternatively, the charger unit can be connected to more than two devices at the same time using the squid connector, as connected to one of the USB output ports on the charger unit. Still alternatively, the charger unit can be combined with the adapter unit to recharge the battery in the charger unit.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A multi-source power adapter comprising:
    a body enclosing electrical connections;
    a wall plug interface operatively connected to the body and configured for insertion into a wall socket;
    a car charger interface formed on the body and configured for connection into a car charger socket, wherein the car charger interface is removably attached to the body;
    an airplane charger interface formed on the body extending outwardly from one end of the body and configured for connection into an airplane charger socket, wherein the airplane charger interface is disposed within the car charger interface when the car charger interface is attached to the body and such that removal of the car charger interface from the body exposes the airplane charger interface for use; and
    a power output port formed in the body, and connected with the wall plug interface, the car charger interface and with the airplane charger interface via the electrical connections enclosed in the body.

2. The multi-source power adapter as claimed in claim 1, wherein the wall plug interface is pivotally connected to the body and is movable between a storage position and a use position.

3. The multi-source power adapter as claimed in claim 1, further comprising at least one connector cable having a first end configured for engagement with the power output port and having a second end configured for engagement with an electronic device for supplying power to said electronic device when one of the wall plug interface the car charger interface and the airplane charger interface is connected with an external power source.

4. The multi-source power adapter as claimed in claim 1, further comprising at least one indicator light provided on the body, said indicator light being operatively connected with the electrical connections housed in the body for indicating when power is applied to one of the wall plug interface the car charger interface or the airplane charger interface from an external power source.

5. The multi-source power adapter as claimed in claim 1, further comprising a battery associated with the electrical connections for supplying electrical current to the power output port and for receiving electrical current from the wall plug interface from the car charger interface or from the airplane charger interface.

6. The multi-source power adapter as claimed in claim 5, further comprising a switch associated with the battery for causing the battery to supply electrical current to the power output port in response to an actuating motion of the body.

7. A multi-source power adapter comprising:
a body enclosing electrical connections;
a wall plug interface operatively connected to the body and configured for insertion into a wall socket;
a car charger interface formed on the body and configured for connection into a car charger socket;
an airplane charger interface formed on the body extending outwardly from one end of the body and configured for connection into an airplane charger socket;
a power output port formed in the body and connected with the wall plug interface, the car charger interface and the airplane charger interface via the electrical connections enclosed in the body; and
at least one connector cable having a first end connecting interface configured for engagement with the power output port and having a second end comprising additional connection interface electrically connected with the connection interface of the first end and configured for engagement with an electronic device for supplying power to said electronic device when one of the wall plug interface, the car charger interface and the airplane charger interface is connected with an external power source.

8. A multi-source power adapter comprising:
a body enclosing electrical connections;
a wall plug interface operatively connected to the body;
a car charger interface formed on the body;
an airplane charger interface formed on the body extending outwardly from one end of the body; and
a power output port formed in the body, and connected with the wall plug interface, the car charger interface and the airplane charger interface via the electrical connections enclosed in the body;
wherein the car charger interface is removably attached to the body, and wherein the airplane charger interface is disposed within the car charger interface when the car charger interface is attached to the body and such that removal of the car charger interface from the body exposes the airplane charger interface for use.

9. The multi-source power adapter as claimed in claim 8, wherein the wall plug interface is pivotally connected to the body and is movable between a storage position and a use position.

10. The multi-source power adapter as claimed in claim 8, further comprising at least one connector cable having a first end configured for engagement with the power output port and having a second end configured for engagement with an electronic device for supplying power to said electronic device when one of the wall plug interface, the car charger interface and the airplane charger interface is connected with an external power source.

11. A multi-source power adapter comprising:
a body enclosing electrical connections;
a wall plug interface operatively connected to the body;
a car charger interface formed on the body;
an airplane charger interface formed on the body extending outwardly from one end of the body wherein power is supplied to the power output port when the airplane charger interface is connected with an airplane charger socket;
a power output port formed in the body, and connected with the wall plug interface and with the car charger interface via the electrical connections enclosed in the body; and
a squid connector cable having a first end comprising a connection interface configured for engagement with the power output port of the body, and having a second end comprising additional connection interfaces electrically connected with the connection interface of the first end and configured for engagement with respective electronic devices to supply power to said electronic devices when one of the wall plug interface and the car charger interface is connected with an external power source;
wherein the car charger interface is removably attached to the body, and wherein the airplane charger interface is disposed within the car charger interface when the car charger interface is attached to the body and such that removal of the car charger interface from the body exposes the airplane charger interface for use.

12. The multi-source power adapter as claimed in claim 11, wherein the wall plug interface is pivotally connected to the body and is movable between a storage position and a use position.

13. The multi-source power adapter as claimed in claim 11, wherein the squid connector cable further comprises a retractor connected between the first end and the second end for adjusting the length of the cable.

14. The multi-source power adapter as claimed in claim 11, further comprising a power indicator means in the squid connector cable to indicate the flow of an electrical current to the additional connection interfaces.

* * * * *